UNITED STATES PATENT OFFICE.

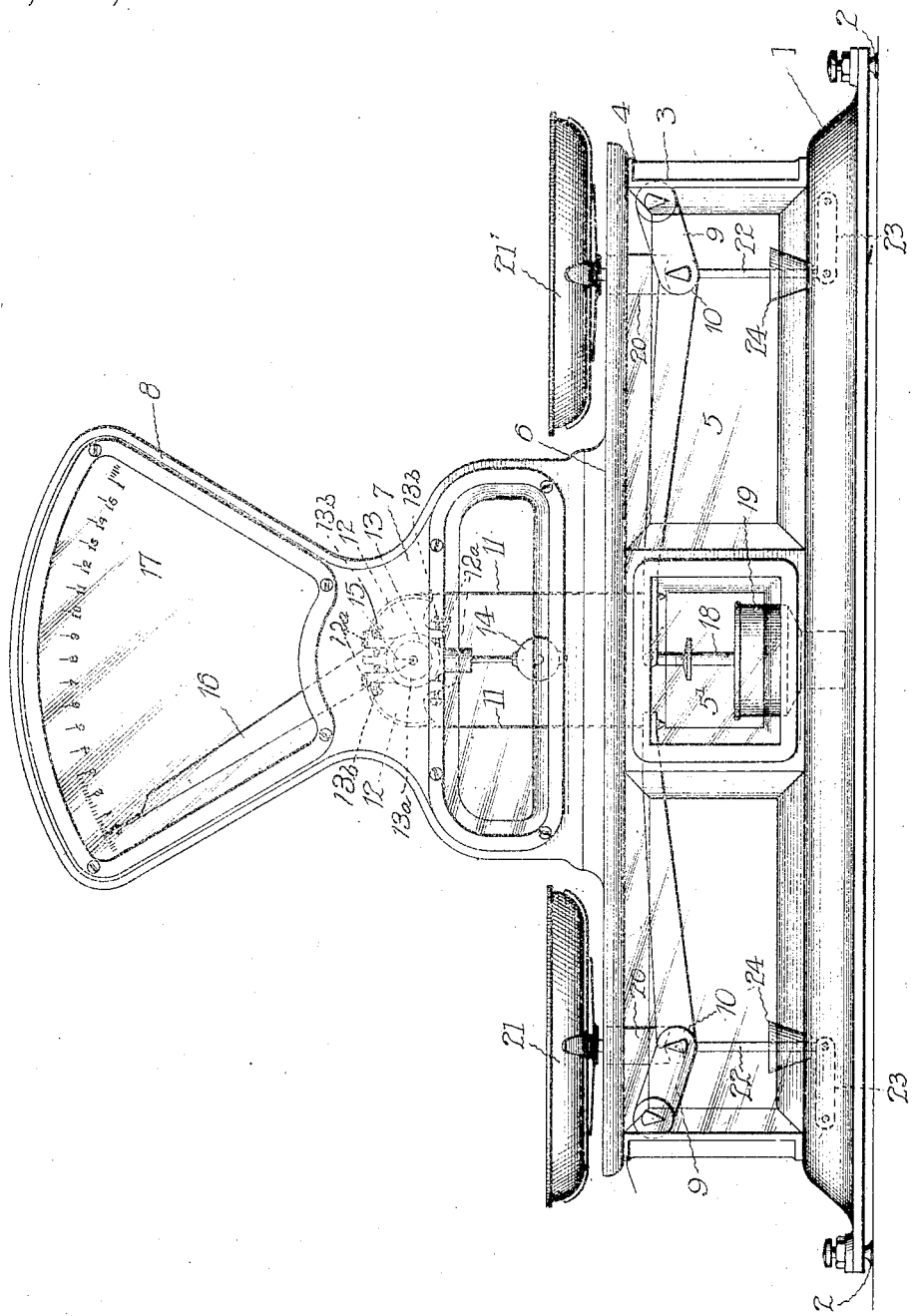

HARRY S. BERGEN, OF TOLEDO, OHIO, ASSIGNOR TO TOLEDO SCALE COMPANY, OF TOLEDO, OHIO, A CORPORATION OF NEW JERSEY.

SCALE.

1,154,965.  Specification of Letters Patent.  Patented Sept. 28, 1915.

Application filed December 19, 1912. Serial No. 737,596.

*To all whom it may concern:*

Be it known that I, HARRY S. BERGEN, a citizen of the United States, residing at Toledo, county of Lucas, and State of Ohio, have invented certain new and useful Improvements in Scales, of which the following is a specification.

My invention relates more particularly to counter scales of the type commonly employed in drug stores and consists in certain features of construction by which the sensitiveness and accuracy of the scale is increased and other advantages obtained which will be apparent from a reading of the following detailed description in connection with the accompanying drawing forming a part of the application. It is to be understood, however, that the detailed disclosure though of the preferred form of my invention is given for the purpose of illustration only, my invention being broader than the specific construction set forth.

In the claims below I have endeavored to point out my invention in such terms as to distinguish it from the prior art but it is to be understood that in presenting them it is not my intention to abandon or relinquish any part of the invention.

The accompanying drawing is a front elevation of my invention as embodied in its preferred form in a scale adapted for counter use.

The base of the scale is shown as of substantially the usual type having a bottom plate of metal or other suitable material provided at its corners with adjustable feet 2, 2, and the rectangular casing 3 mounted thereon comprises suitable end pieces or frames 4, 4 and panels 5, 5' of plate glass, a top 6 resting upon the end walls and panels completing the box-like casing or inclosure. Over the central portion of the casing is supported a housing 7 communicating with the former containing a weight offsetting means and comprising a fan-shaped chart casing 8. At opposite ends of the box-like casing 3 are fulcrumed two similar levers 9, 9 of the second order which are slightly crooked or elbowed as at 10, 10 and connected at their inner ends by straps 11, 11 with the segments 12, 12 mounted to turn with a casting 13 to which is secured a load offsetting pendulum 14. The casting 13 is transversely bored and mounted upon a cylindrical arbor $13^a$ upon which are also mounted in like manner the segments referred to above, whose angular position with reference to the casting is adjusted by screws $13^b$, $13^b$ tapped through flanges $12^a$, $12^a$ and bearing upon the casting above and below the axis thereof, as plainly appears in the drawing. An indicator hand 16 is mounted to turn with the pendulum structure and to indicate the weight of a commodity placed upon the scale pan $21^1$.

One of the scale levers or beams, it matters not which, is prolonged beyond the point of attachment of its strap 11, and connected to the piston rod 18 of a dash pot 19 for preventing violent movement of the parts of the scale and bringing them quickly to rest. Each of the scale levers is provided at the elbow or bend, above mentioned, with upwardly directed knife edges upon which are borne the down turned ends of a spider 20 connected to the scale pan 21, $21^1$. Check rods 22 are also connected to the spiders and to check links 23 for the usual purpose of retaining the scale pans in substantially horizontal positions. In order to seal the scale each check rod or stem 22 is provided at its lower end with a shot box 24, 24 which not only serves to adjust the scale but by reason of its distance below the pivot of the pan to assist materially in retaining the latter level, thereby reducing the strain and friction on the check mechanism.

The operation of my scale will now be obvious. The levers and connected parts upon opposite sides of the load offsetting pendulum substantially counterbalance each other when empty so that there is no occasion for the counterbalancing weight commonly used specifically for this purpose. When a commodity to be weighed is placed upon the scale pan $21^1$, the system is thrown out of balance and the pendulum 14 moves upward until its torsional effect counterbalances the weight of the commodity, which is then read upon the scale; if, however, the weight of the commodity is in excess of the capacity of the chart, movable poises or weights are added to the scale pan 21 until the weight of the commodity is counterbalanced to within the capacity of the chart. The total weight of the commodity is found by adding the weights placed upon the scale pan 21 to that indicated upon the chart.

I claim:

1. In a weighing machine, a pair of scale beams, scale pans mounted thereon, a pendulum weight offsetting means pivoted intermediate said beams, a pair of segments separately adjustable annularly with relation to said pendulum, an indicator carried by the pendulum, and a chart with which the indicator coöperates.

2. In a weighing scale, a pair of scale beams, scale pans mounted thereon, a pendulum weight-offsetting means pivoted intermediate said beams and above the same, a pair of segments angularly adjustable about the axis of the pendulum, adjusting screws for individually adjusting the same with relation to the pendulum, ribbons connected at their lower ends to the ends of the scale beams and passing over said segments, an indicator chart and a hand mounted upon the pendulum structure and coöperating with the chart.

3. In a weighing scale, a pair of scale beams, scale pans carried thereby, a single weight-offsetting pendulum coöperating with both of the scale beams, a pair of oppositely-disposed segments removably secured to said pendulum and angularly adjustable about the axis thereof, separate adjusting means for each of said segments whereby it may be individually adjusted relatively to the pendulum and the other segment, indicating means carried by the pendulum, and means for connecting the segments with the scale beams.

HARRY S. BERGEN.

Witnesses:
F. A. CROWLEY,
GEORGE H. MOULD.